(12) United States Patent
Maurer (10) Patent No.: US 6,860,800 B1
(45) Date of Patent: Mar. 1, 2005

(54) PANEL TURNING APPARATUS

(76) Inventor: Ronald L. Maurer, 5697 N. Pennsylvania St., Indianapolis, IN (US) 46220

( * ) Notice: Subject to any disclaimer, the term of this patent is extended or adjusted under 35 U.S.C. 154(b) by 0 days.

(21) Appl. No.: 10/304,715

(22) Filed: Nov. 26, 2002

(51) Int. Cl.⁷ .............................................. B24B 41/06
(52) U.S. Cl. ...................... 451/364; 451/411; 29/281.1; 269/289 MR
(58) Field of Search ................................ 451/364, 378, 451/385, 379, 411; 269/289 R, 289 MR, 71; 29/281.1

(56) References Cited

U.S. PATENT DOCUMENTS

| | | | | |
|---|---|---|---|---|
| 1,600,835 A | * | 9/1926 | Manley | 269/46 |
| 1,812,585 A | * | 6/1931 | Collins | 269/59 |
| 4,239,196 A | * | 12/1980 | Hanger | 269/17 |
| 5,617,622 A | * | 4/1997 | Anderson | 29/281.3 |
| 6,170,141 B1 | * | 1/2001 | Rossway et al. | 29/281.1 |
| 6,231,036 B1 | * | 5/2001 | Johnson et al. | 269/56 |
| 6,292,999 B1 | * | 9/2001 | Rossway et al. | 29/559 |
| 6,298,536 B1 | * | 10/2001 | Rossway et al. | 29/281.1 |
| 6,572,092 B2 | * | 6/2003 | DuVernay et al. | 269/71 |

* cited by examiner

*Primary Examiner*—Lee D. Wilson
(74) *Attorney, Agent, or Firm*—Woodard, Emhardt, Moriarty, McNett & Henry LLP (57) ABSTRACT

A panel turning apparatus which turns a panel from a first orientation to a second, desired orientation. The apparatus has a rotatable portion rotatable about an axis of rotation thereof, and a base portion which supports the rotatable portion for rotation about the axis of rotation. The rotatable portion has a panel carrying portion aligned with the axis of rotation, a supported portion which supports the rotatable member for rotation and a driving portion by which the rotatable member is rotated to carry a panel carried by the panel carrying portion from the first orientation to the second, desired orientation. The apparatus permits a panel, even a large and heavy panel, to be turned safely and easily by one person.

17 Claims, 7 Drawing Sheets

PANEL TURNING APPARATUS

BACKGROUND OF THE INVENTION

1. Field of the Invention

The present invention relates generally to a panel turning apparatus; and, more particularly, to an apparatus for turning a panel from a first orientation to a second, desired orientation.

2. Description of the Prior Art

In the manufacture of panels for various applications, it is often necessary to perform one or more operations on opposite sides of the panels. For example, the Assignee of the present application manufactures panels of solid surfacing material for use in numerous products including counter tops, table tops, wall partition systems and the like; and during the process of manufacturing such panels, it is necessary to sand both sides of the panels. This is typically accomplished by laying a panel on a work table, sanding the upwardly facing side thereof, turning the panel over and then sanding the opposite side.

Panels of solid surfacing material, however, are often rather large and heavy. For example, such panels are commonly manufactured in sizes of up to 12 feet long by 3 feet wide and may weigh as much as 250 pounds. Obviously, panels of such size and weight cannot easily be handled by one person; and, as a result, it typically requires at least two people to pick up a panel which has been sanded on one side and turn it over so that it may be sanded on the opposite side. The necessity of waiting until a second person is available to assist in turning over a panel slows up the overall process of manufacturing the panel, and also requires that the second person stop whatever he is doing thus interfering with his work schedule as well.

Because of the weight and size of the panels, there is also a risk of injury to a worker or damage to a panel due to a panel slipping or being dropped as it is being handled.

After the sanding operations have been completed on both sides of a panel, it then becomes necessary to transfer the panel to a different location for storage or to permit a different type of operation to be performed. The same problem will again occur in that a second person must be called over to assist in carrying the panel to the different location.

SUMMARY OF THE INVENTION

The present invention provides an apparatus for turning a panel from a first orientation to a second, desired orientation. A panel turning apparatus according to the invention has a rotatable member having an axis of rotation, and a base member which supports the rotatable member for rotation about its axis of rotation. The rotatable member includes a panel carrying portion which is aligned with the axis of rotation, a supported portion by which the rotatable member is supported for rotation, and a driving portion by which the rotatable member is rotated. The supported portion includes at least one circular element having a peripheral surface coaxial with the axis of rotation, and the base member includes a supporting portion which supports the at least one circular element of the rotatable member at the peripheral surface thereof such that rotation of the rotatable member relative to the base member by the driving portion turns a panel carried by the panel carrying portion from the first orientation to the second, desired orientation.

With the panel turning apparatus of the present invention, a panel, even a large and heavy panel, can be inserted into the apparatus in the first orientation, turned to the second, desired orientation by operation of the apparatus, and then withdrawn from the apparatus in the second, desired orientation safely and easily by a single person. For example, in one important application of the invention, a panel positioned on a work table and having had an operation performed on an upwardly facing side thereof can be inserted into the panel carrying portion of the apparatus, the rotatable member rotated through 180 degrees to turn the panel over and the panel then returned to the work table with the opposite side thereof facing upwardly so that the same or a different operation can then be performed on the opposite side. Because the panel carrying portion extends along the axis of rotation of the rotatable member, a panel carried thereby will remain in the same plane after it has been turned over such that it can be easily returned to the same or a different work table for further treatment.

According to a presently preferred embodiment of the Invention, the panel carrying portion comprises first and second sets of rollers which extend for substantially the entire length of the rotatable member and which define a panel receiving chamber therebetween for receipt of a panel to be turned. The panel carrying portion also includes openings at one or both ends thereof through which a panel is inserted into or removed from the panel receiving chamber. Tapered guides are preferably also provided at the openings to assist in guiding a panel through the openings and into the panel receiving chamber.

The first and second sets of rollers permit a panel to be easily rolled into or out of the panel receiving chamber of the panel carrying portion by one person; and, in addition, effectively support the panel in position in the rotatable member as it is being rotated. The individual rollers of the first and second sets of rollers are preferably provided with a covering of silicone rubber or other suitable material to reduce friction and prevent abrasion of the surfaces of the panel as it is being turned and as it is rolled into or out of the panel receiving chamber.

The supported portion of the rotatable member preferably comprises a pair of spaced, circular elements attached to the panel carrying portion and rotatable therewith. The supporting portion of the base member preferably includes a pair of spaced frames each of which carry a plurality of freely rotatable wheels which support the pair of circular elements at their peripheral surfaces. By supporting the circular elements at their peripheral surfaces, a panel to be turned can be inserted into and removed from the rotatable member along its axis of rotation to greatly facilitate handling of the panel.

The driving portion of the rotatable member preferably comprises structure on the rotatable member which may be grasped by the worker so as to manually rotate the rotatable member by the appropriate amount to turn a panel from the first orientation to the second, desired orientation. Such structure may conveniently comprise a plurality of rods or the like which are attached to and extend between the pair of circular elements and which further function to reinforce and strengthen the apparatus. Alternatively, if desired, the driving portion can include structure for rotating the rotatable member in an automated manner for example, as part of an automated production line.

As indicated above, the panel turning apparatus of the present invention is especially useful for turning a panel over so that operations can be performed on opposite sides thereof. To this end, stopping structure may be provided on the base member and the rotatable member which cooperate with one another to automatically stop the rotation of the rotatable member when it has been rotated by 180 degrees. The panel turning apparatus of the invention, however, is not limited to applications in which a panel is turned over and may be used to turn a panel by any desired amount. For example, in certain applications, it might be desired to turn a panel by 90 degrees so that it may be placed on a storage shelf or the like in a vertical orientation. For such applications, the panel carrying portion of the rotatable member preferably also includes a plurality of ball bearings or other rotatable elements mounted along each side thereof to support a panel therein in a vertical orientation and to permit the panel to be easily rolled into or out of the apparatus while in such orientation.

According to a further aspect of the invention, the base member can include track mounting structure to support the apparatus on tracks to permit the apparatus to be easily moved from one location to another. Alternatively, or in addition, the base member can include telescoping structure so that the rotatable member can be raised or lowered as desired or required for specific applications.

The panel turning apparatus of the present invention can be used in numerous applications wherein it is desired to turn a panel from a first orientation to a second orientation. The apparatus can be utilized with panels of various types and of widely differing size and thickness; and, in fact, because the rotatable member and the base member are separate components, different rotatable members may be utilized with the same base member, if desired, to accommodate different types or sizes of panels.

Further advantages and specific details of the present invention will become apparent hereinafter in conjunction with the following detailed description of presently preferred embodiments thereof.

DETAILED DESCRIPTION OF THE PREFERRED EMBODIMENTS

Figure 1A:
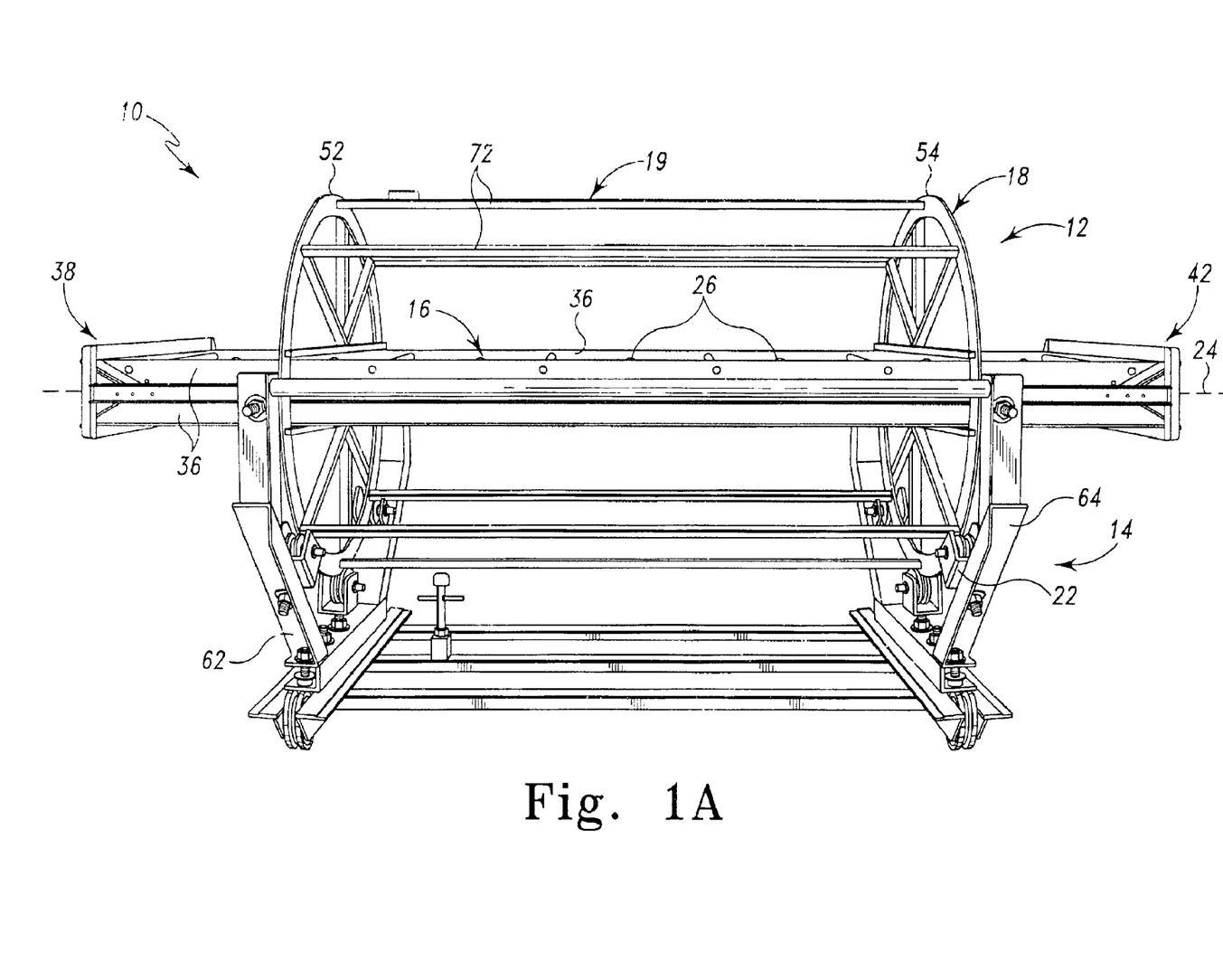
FIG. 1A is a perspective side view of a panel turning apparatus according to a presently preferred embodiment of the invention.

FIG. 1A illustrates a panel turning apparatus according to a presently preferred embodiment of the invention. The apparatus is designated by reference number 10 and generally comprises a rotatable member 12 and a base member 14.

Rotatable member 12 includes a panel carrying portion 16 for carrying a panel to be turned, a supported portion 18 by which the rotatable member is supported for rotation about an axis of rotation 24 thereof and a driving portion 19 by which the rotatable member is rotated. The base member 14 includes a supporting portion 22 which supports the supported portion 18 of the rotatable member.

Figure 3:
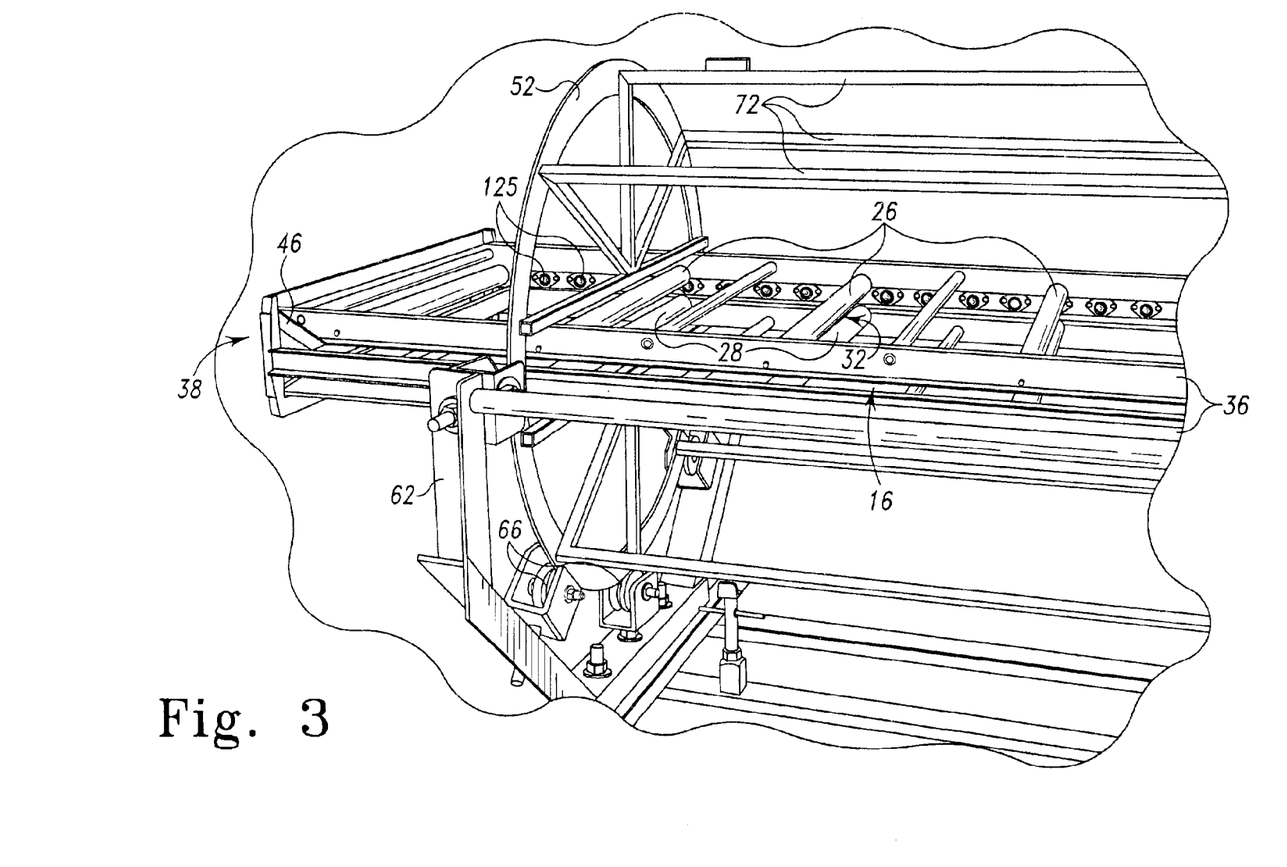
FIGS. 3–5 are perspective views of portions of the panel turning apparatus of FIG. 1A illustrating certain features of the apparatus in greater detail.

As best shown in FIGS. 1A and 3, the panel carrying portion 16 of the rotatable member 12 extends along and is aligned with the axis of rotation 24 of the rotatable member. Portion 16 includes a first set of rollers 26 and a second set of rollers 28 which extend parallel to the axis of rotation 24 and which are spaced from one another to define an elongated panel receiving chamber 32 between the roller sets for receiving a panel to be turned by the apparatus. In the illustrated embodiment, each set of rollers 26 and 28 comprise: seven rollers the axes of which extend perpendicular to the axis of rotation 24, and each roller of the first set is aligned with a corresponding roller of the second set. Each roller 26, 28 is mounted to and extends between side frames 36 of the panel carrying portion 16 of the rotatable member 12 so as to be freely rotatable with respect thereto.

Figure 2:
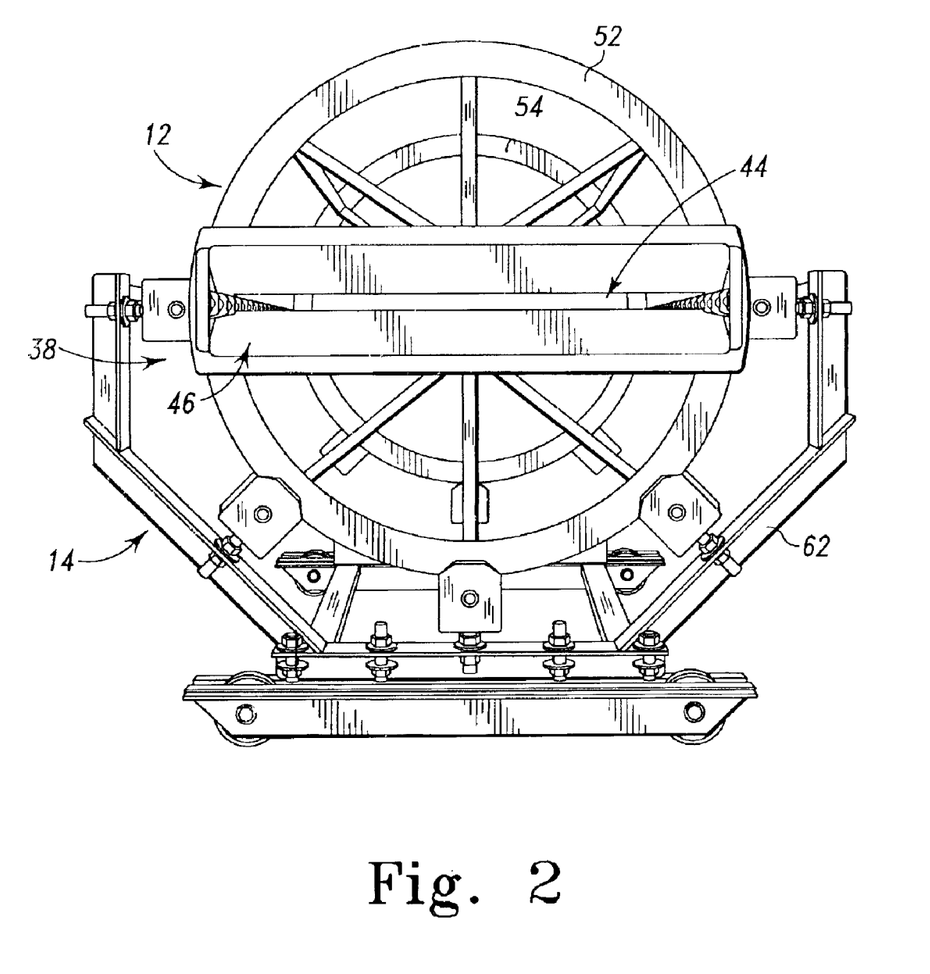
FIG. 2 is a perspective end view of the panel turning apparatus of FIG. 1A.

The sets of rollers 26 and 28 extend from substantially one end 38 of the rotatable member 12 to the opposite end 42 thereof, and define an opening 44 at each end (see FIG. 2) through which a panel may be inserted into or removed from the panel receiving chamber 32. As shown in FIGS. 2 and 3, a V-shaped guide 46 is preferably provided adjacent the openings 44 at each end 38 and 42 (see FIG. 1A) to assist in guiding a panel into and through the openings 44 and into the panel receiving chamber 32.

Continuing with reference to FIG. 1A, the supported portion 18 of the rotatable member 12 comprises a spaced pair of circular elements 52 and 54. Circular elements 52 and 54 are attached to the side frames 36 of the panel carrying portion 16 of the rotatable member 12 so as to be integral with the panel carrying portion, and are coaxial with the axis of rotation 24 of the rotatable member. In effect, the circular elements 52 and 54 carry and support the panel carrying portion 16 such that rotation of the circular elements will correspondingly rotate the panel carrying portion.

The supporting portion 22 of base member 14 comprises a pair of upwardly excluding support frames 62 and 64. Support frames 62 and 64 are identical and are spaced from one another by the same distance as the spacing between the circular elements 52 and 54 of the rotatable member 12. Each support frame comprises an upwardly extending, somewhat V-shaped member having five sides, and each of the five sides of each frame supports a wheel 66 which extends inwardly of the frame. More particularly, and as best shown in FIG. 5, a V-shaped bracket 67 is mounted to each side of the frame by a threaded bolt 68. A rod 69 extends between the arms of the bracket and a wheel 66 (see FIG. 4) is supported axially on the rod so as to be freely rotatable thereon. Each wheel 66 has a groove 70 (see FIG. 4) which extends around its outer peripheral surface.

Figure 4:
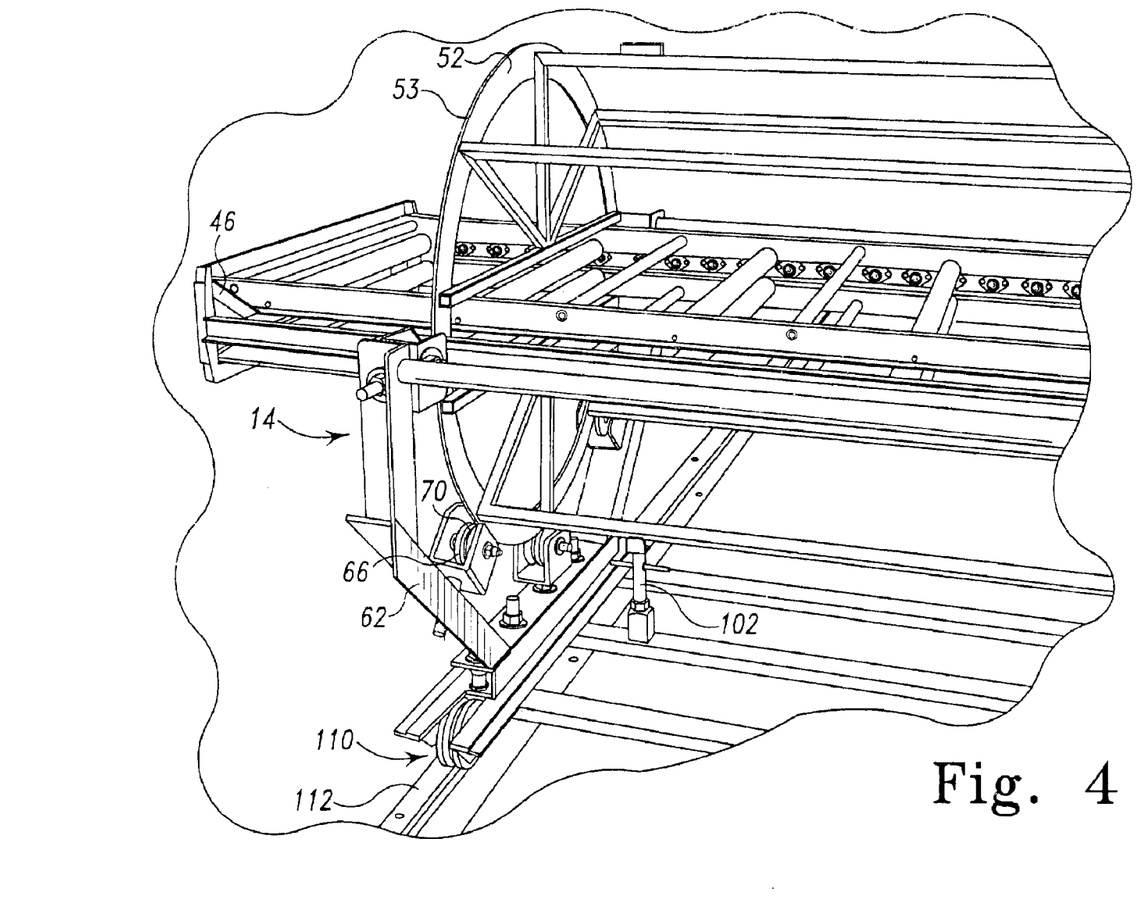
Figure 5:
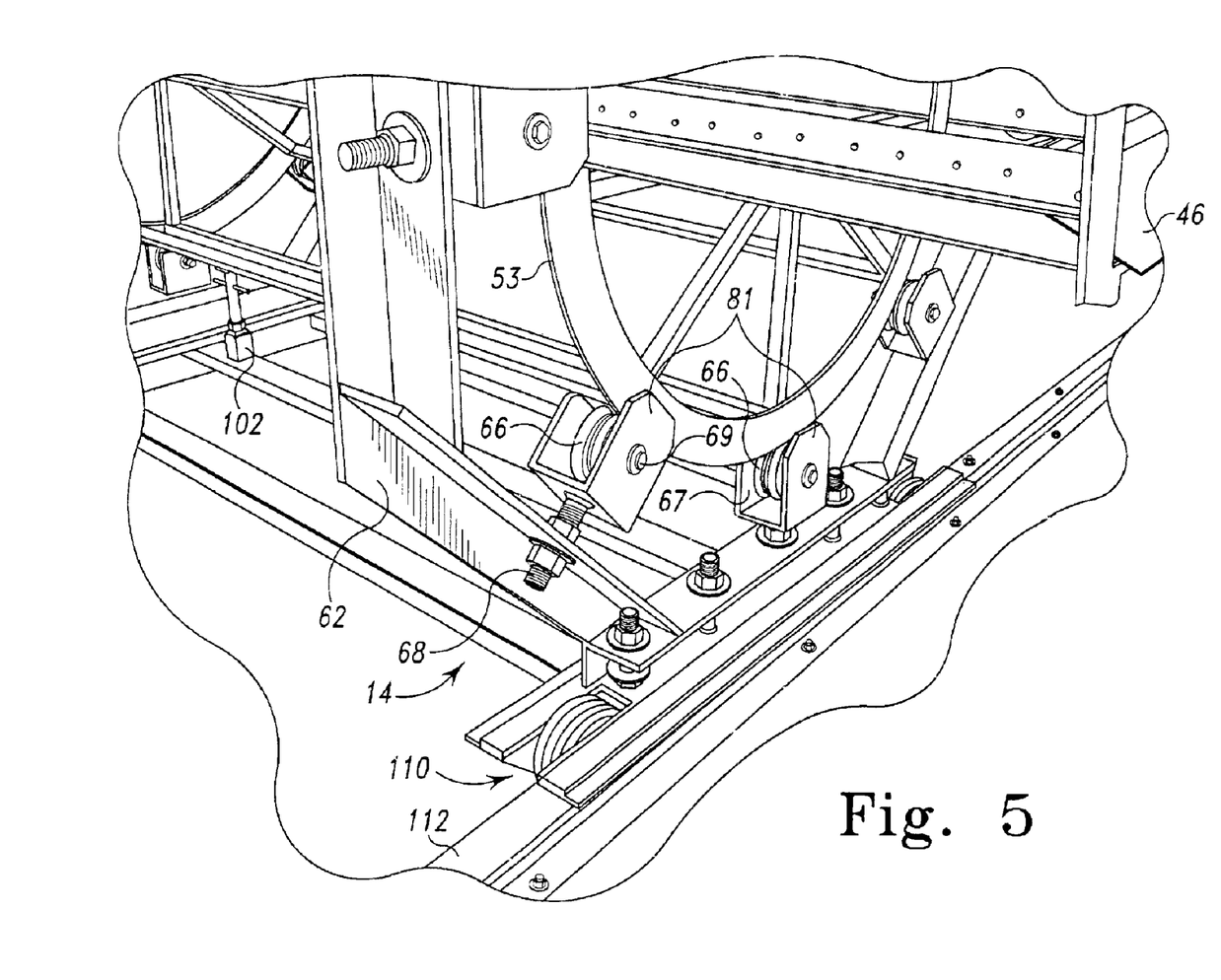

As best shown in FIGS. 2, 4 and 5, the peripheral surfaces 53 of the circular elements 52 and 54 of the rotatable member 12 are received and supported in the grooves 70 of the plurality of wheels 66. Because the wheels 66 themselves are freely rotatable, and because the rotatable member 12 as a whole rests on and is supported by the wheels, the rotatable member is freely rotatable relative to the base member.

Returning to FIG. 1A, in order to rotate the rotatable member 12, a driving portion 19 is provided thereon. In the presently preferred embodiment described herein, the driving portion comprises a plurality of rods 72 or the like which are attached to and extend between the circular elements 52 and 54; and any one of these rods 72 may simply be grasped by a worker and pulled downwardly to manually rotate the rotatable member 12. These rods 72 also function to reinforce and strengthen the rotatable member 12.

The function of the panel turning apparatus 10 of the present invention, as indicated previously, is to turn a panel from a first orientation to a second, desired orientation. One important application of the apparatus is to turn a panel, which has had an operation performed on one side thereof, over so that the same or a different operation may be performed on its opposite side; and FIG. 1A viewed in conjunction with FIG. 1B illustrate how this may easily be accomplished.

Figure 1B:
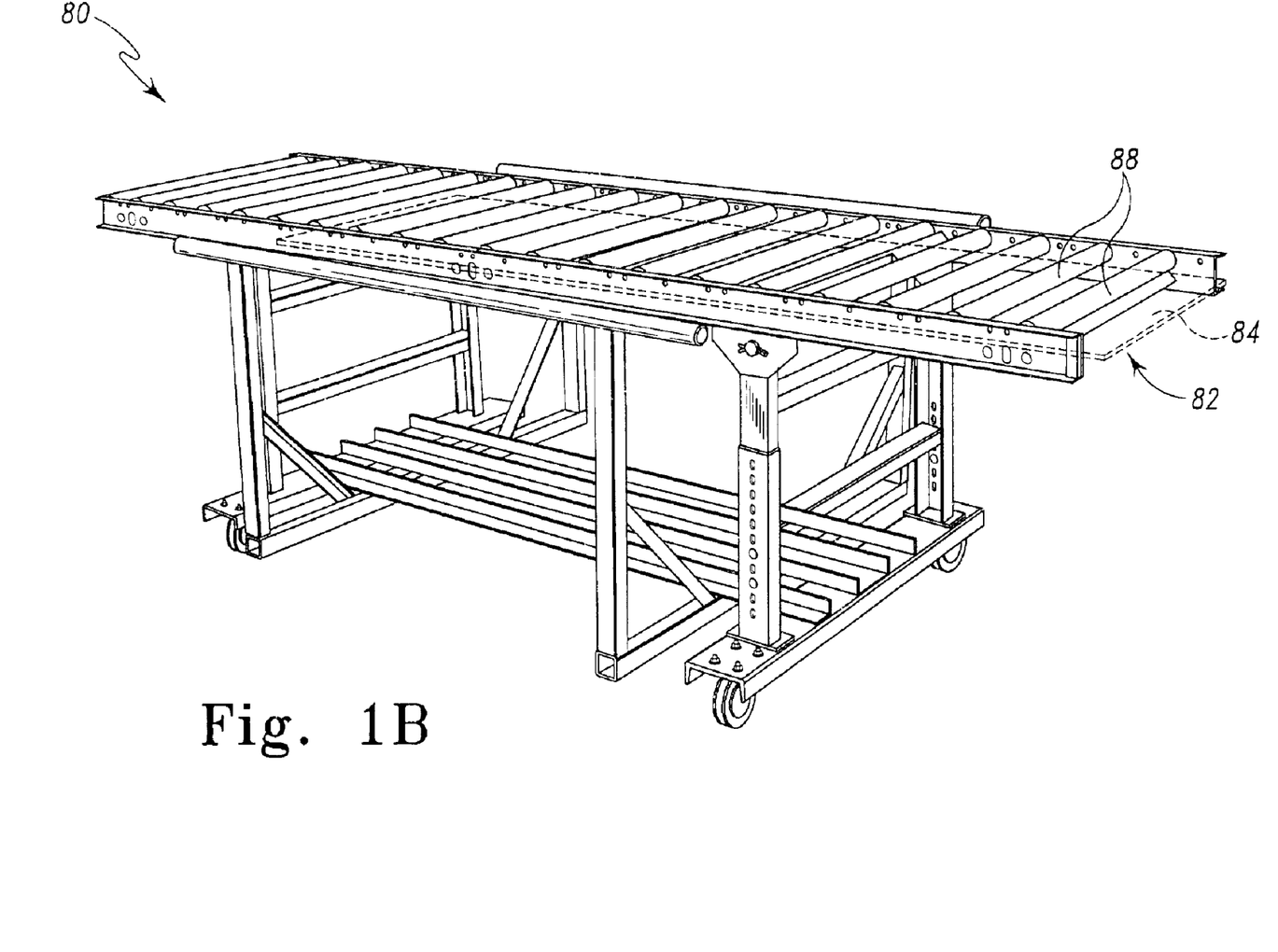
FIG. 1B is a work table with which the panel turning apparatus of FIG. 1A may be utilized in certain applications of the invention.

Specifically, FIG. 1B illustrates a work table 80 having a panel 82 (illustrated in dotted line) supported thereon. The panel may, for example, comprise a panel of solid surfacing material which is being manufactured for use in a counter top, table top, wall partition system or other product; and as part of the process of manufacturing such a panel, it is usually necessary to sand both sides of the panel. Thus, after the upwardly facing side 84 of the panel 82 has been sanded on the work table, it is necessary to turn the panel over so that the opposite side thereof can be sanded. Because panels of solid surfacing material are commonly manufactured in sizes up to 12 feet long by 3 feet wide and may weigh as much as 250 pounds, panel 82 often cannot be easily turned over by one person, and it has been the practice for a worker to call over a second person to assist in turning the panel over. With the apparatus of the present invention, however, it becomes a simple process for a single worker to turn the panel over without assistance.

Specifically, the apparatus 10 of FIG. 1A is positioned adjacent to an end of the work table 80 of FIG. 1B. The panel 82, which has been sanded on its upper surface 84 is then simply pushed into the panel carrying portion 16 of the apparatus through the opening 44 (see FIG. 2) in one end 38 thereof. The tapered guides 46 help to direct the panel smoothly into and through the opening 44. The panel can be easily pushed through the opening and into the panel receiving chamber 32 by one person because it will simply roll into position along one of the sets of rollers 26 (see FIG. 3) or 28. In this regard, each of the rollers 26 and 28 is preferably covered with a layer of silicone rubber or the like so as to reduce friction between the surfaces of the rollers and of the panel and to prevent any abrasion of the panel. As shown in FIG. 1B, the upper surface of the work table 80 may also be defined by a set of rollers 88 to further facilitate rolling of the panel into the apparatus 10, although this is not essential to the present invention.

After the panel has been fully inserted into the panel receiving chamber 32 (see FIG. 3) of the apparatus, one of the bars 72 is grasped by the worker and pulled downwardly (or pushed upwardly, if desired, as the rotatable member is rotatable in either direction) to rotate the rotatable member 12; and, correspondingly, to turn the panel supported therein. When the rotatable member has been rotated by 180 degrees, the panel will have been turned over, and it may then be returned to the work table 80 with the side opposite side 84 now facing upwardly by simply rolling it out of the chamber 32 through the same opening 44 (see FIG. 2) in the end 38 of the rotatable member. Alternatively, the panel may be rolled out of the chamber 32 through the opening 44 in end 42 of the rotatable member to position the panel on another work table or the like for further processing.

Because, in the present invention, the panel receiving chamber 32 extends along the axis of rotation 24 of the rotatable member 12, after the member has been rotated to turn over the panel carried therein, the panel will remain in the same plane and thus will automatically be aligned with the surface of the work table 80 to be easily returned thereto. If desired, an appropriate stopping structure may be provided on the base member and the rotatable member, to automatically stop the rotatable member after it has been rotated by 180 degrees. As shown in FIGS. 4 and 5 with continued reference to FIGS. 1A and 2, stopping structure in the form of an upwardly extending pin 102 is provided on the base member and an extended portion or the like is provided or two diametrically opposed ones of the rods 72 of the rotatable member which are positioned to engage the rod when the rotatable member has been rotated by 180 degrees so as to prevent further rotation. The stopping structure can, of course, take any desired form; and the illustrated structure is intended to be exemplary only. The pin 102 may be mounted to the base in such a manner as to be movable downwardly somewhat out of the path of the rotatable member when it is not being used.

As indicated above, the circular elements 52 and 54 of the rotatable member 12 rest in grooves 70 on the periphery of the wheels 66 on the base member, and the wheels support the circular elements at their peripheral surfaces 53. Thus, the openings 44 on both ends 38 and 42 of the rotatable member 12 may be positioned on the axis of rotation 24 of the rotatable member and panels may be inserted into or removed from the apparatus through either opening along the axis of rotation as well.

The force exerted by the wheels 66 against the peripheral surfaces 53 of the circular elements 52 and 54 can be adjusted to control the force required to rotate the rotatable member 12 relative to the base member 14. This can be conveniently accomplished by turning the threaded bolts 68 which mount the brackets 67 to the support frames 62 and 64 so as to move the wheels 66 inwardly or outwardly relative to the frames. In general, the tension should be sufficiently weak to permit the rotatable member 12 to be rotated fairly easily by hand; but, at the same time, it is preferable that the tension be sufficiently strong to prevent the rotatable member from rebounding or turning by itself when it reaches the desired orientation. It should also be noted that the outer arm 81 of each of the brackets 67 is somewhat larger than the inner arm of the brackets (see FIG. 5). This is a safety feature to reduce the risk of injury by preventing a worker from accidentally touching the wheels 66 or other structure during operation of the apparatus.

Rotation of selected ones of the threaded bolts 68 to move selected ones of the wheels 66 in or out also permits precise adjustment of the position of the rotatable member 12. For example, the rotatable member can be raised or lowered slightly or moved sideways somewhat relative to the base member by separately adjusting the position of one or more of the wheels 66 to accurately align the rotatable member with the surface of the work table 80 (see FIG. 1B). It is also possible to adjust the positions of the rollers 66 on one of the support frames 62 and 64 with respect to the other of the support frames so that one end of the rotatable member 12 will be slightly higher or slightly lower than the other end. This adjustment can be used, for example, to cause a panel to roll downwardly somewhat as it is pushed into or out of the panel receiving chamber 32 (see FIG. 3) so that a panel can be even more easily rolled into or out of the panel receiving chamber.

Figure 6:
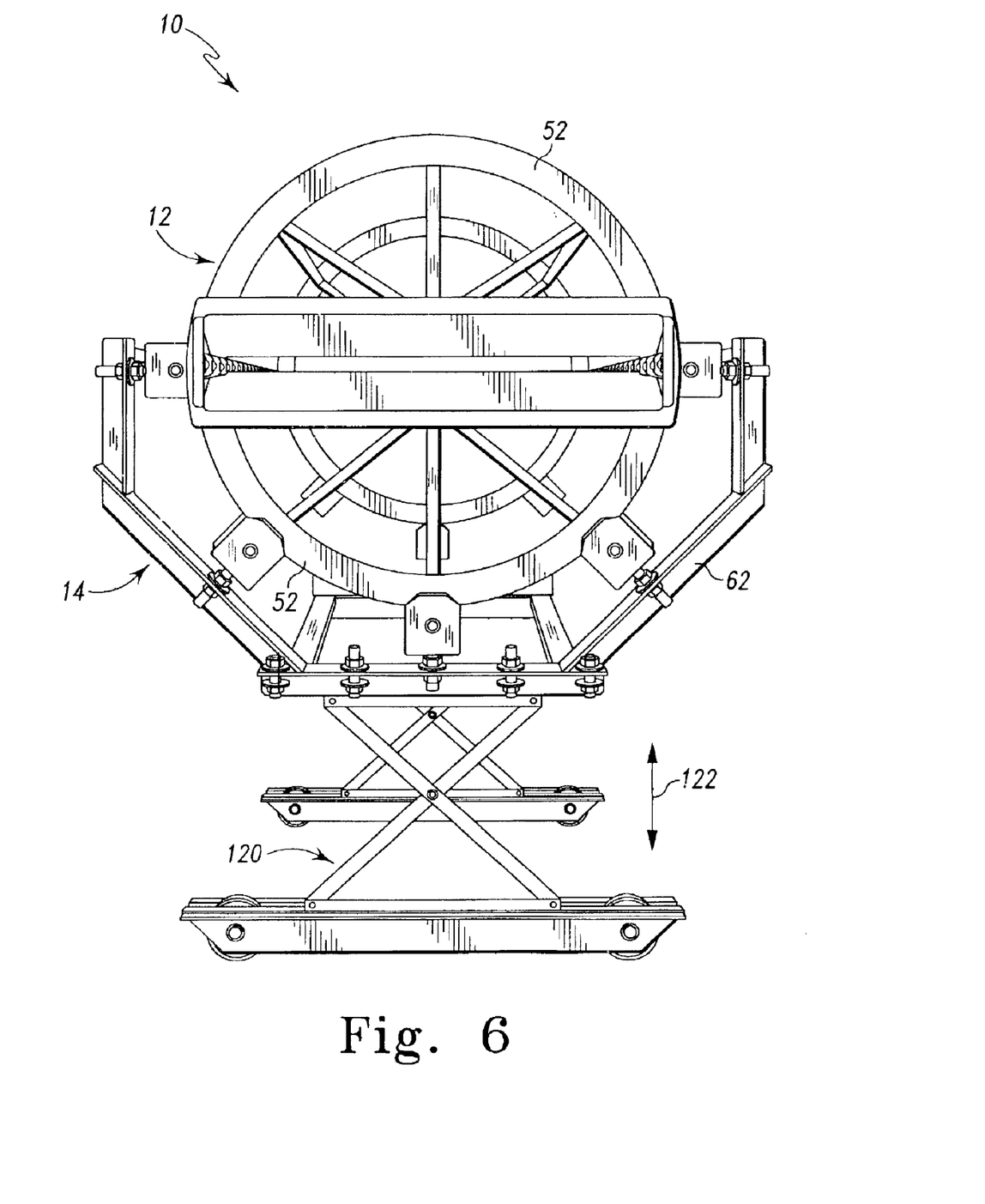
FIG. 6 illustrates a panel turning apparatus according to a second embodiment of the present invention.

As shown in FIGS. 4 and 5, the base member 14 of the panel turning apparatus 10 of the present invention may include track mounting structure 110 to mount the apparatus on tracks 112 so that the apparatus can easily be moved from location to location in a plant, for example. In an alternative embodiment as shown in FIG. 6, the base member 14 may include a telescoping table schematically illustrated at 120 or other suitable structure which enables the apparatus to be moved up or down as indicated by the arrow 122 to adjust the height of the apparatus. The use of a telescoping table, in particular, permits the apparatus to be used in various other panel turning applications. For example, it might be desired to transfer a panel from a work table such as shown in FIG. 1B to a shelf or the like for storage. To accomplish this, a panel can be inserted into one end of the apparatus from the work table as described above, the rotatable portion 12 thereof rotated through 90 degrees to turn the panel onto its edge, and the panel then rolled out of the opposite end of the apparatus in that orientation onto a storage shelf or the like. Again this can easily be accomplished by one person. If the shelf is elevated relative to the work table, the telescoping table 120 may simply be raised to the appropriate height before the panel is withdrawn from the apparatus.

To facilitate rolling a panel into or out of the rotatable member when the panel is in a vertical orientation and to support a panel in the apparatus in this orientation, a plurality of ball bearings 125 (best shown in FIG. 3) are preferably mounted by means of suitable mounting structure to and in a row along the length of the side panels 36 (or to different side panels) on both sides of the panel carrying portion 16. When the panel is vertically oriented in the chamber 32, an edge of the panel will rest on one of the rows of ball bearings 125 so that the panel can be easily rolled into or out of the panel receiving chamber in this orientation and will not be damaged during its movement.

The apparatus of the present invention can be used to turn panels of varying type, size, thickness and weight. The preferred embodiments illustrated herein have been designed to turn panels having dimensions of up to 12 feet long by 3 feet wide and having a thickness of up to ¾ inch. In these embodiments, the panel receiving chamber is approximately 12 feet long, slightly more than three feet wide and about 2 and ½ inches high; the rollers are about 2 inches in diameter and the rollers in each set are spaced about two feet apart. The circular elements are about 8 feet apart and have a diameter of about 45 inches. The ball bearings 125 are about one inch in diameter. These various dimensions, however, are intended to be exemplary only as the apparatus could easily be constructed to handle panels having different dimensions in any application wherein it is desired to turn a panel from one orientation to a second orientation. In this regard, in particular, because the rotatable member 12 simply rests upon the wheels 66 of the base member 14, it is possible, if desired, to provide two or more rotatable members sized for different applications which can be selectively mounted off the same base member.

The article to be turned by the apparatus of the present invention has been generally referred to in this application as a "panel". It should be understood, however, that this term has been used for convenience only and is intended to include any type of generally flat element whether it be commonly referred to as a panel or by some other term such as a plate, sheet or the like.

While what has been described herein constitutes presently preferred embodiments of the invention, it should be recognized that the invention could take numerous other forms. Accordingly, it should be understood that the invention should be limited only insofar as is required by the scope of the following claims.

What is claimed:

1. Panel turning apparatus for turning a panel from a first orientation to a second, desired orientation, comprising:
    a rotatable member which is rotatable about an axis of rotation thereof, said rotatable member including:
        a panel carrying portion which is aligned with the axis of rotation,
        a supported portion by which the rotatable member is supported for rotation, the supported portion comprising at least one circular element having a peripheral surface coaxial with the axis of rotation, and
    a driving portion by which the rotatable member is rotated to turn a panel carried by the panel carrying portion from the first orientation to the second, desired orientation and a base member, the base member including a supporting portion which supports the at least one circular element of the rotatable member at the peripheral surface thereof.

2. The panel turning apparatus of claim 1 wherein said at least one circular element comprises first and second circular elements, and wherein said supporting portion of said base member comprises first and second support frames for supporting said first and second circular elements at their peripheral surfaces.

3. The panel turning apparatus of claim 2 wherein a plurality of rotatable wheels are mounted to each of said first and second support frames, each of said rotatable wheels having a peripheral groove which receives the peripheral surface of a circular element of said rotatable member to support said rotatable member.

4. The panel turning apparatus of claim 1 and further including stopping structure on said rotatable member and said base member for automatically stopping the rotatable member when a panel carried therein has been turned to said second, desired orientation.

5. The panel turning apparatus of claim 1 wherein said second, desired orientation is turned 180 degrees relative to said first orientation.

6. The panel turning apparatus of claim 1 wherein said second, desired orientation is turned 90 degrees relative to said first orientation.

7. The panel turning apparatus of claim 1 wherein said base member includes track mounting structure for mounting said apparatus on a track.

8. The panel turning apparatus of claim 1 wherein said base member includes a telescoping table for raising and lowering said rotatable member.

9. Panel turning apparatus for turning a panel from a first orientation to a second, desired orientation, comprising:
    a rotatable member which is rotatable about an axis of rotation thereof, said rotatable member including:
        a panel carrying portion which is aligned with the axis of rotation, said panel carrying portion including first and second sets of rollers extending parallel to the axis of rotation and defining a panel receiving chamber therebetween for receipt of a panel to be turned,
        a supported portion by which the rotatable member is supported for rotation, the supported portion comprising at least one circular element having a peripheral surface coaxial with the axis of rotation, and
    a driving portion by which the rotatable member is rotated to turn a panel carried by the panel carrying portion from the first orientation to the second, desired orientation and a base member, the base member including a supporting portion which supports the at least one circular element of the rotatable member at the peripheral surface thereof.

10. The panel turning apparatus of claim 9 and further including an opening at least one end of said panel receiving chamber for insertion of a panel into and withdrawal of a panel from said chamber.

11. The panel turning apparatus of claim 10, and further including a guide at said opening for guiding a panel through said opening into said panel receiving chamber.

12. Panel turning apparatus for turning a panel from a first orientation to a second, desired orientation, comprising:
- a rotatable member which is rotatable about an axis of rotation thereof, said rotatable member including:
  - a panel carrying portion which is aliened with the axis of rotation,
  - a supported portion by which the rotatable member is supported for rotation, the supported portion comprising at least one circular element having a peripheral surface coaxial with the axis of rotation, and
- a driving portion by which the rotatable member is rotated to turn a panel carried by the panel carrying portion from the first orientation to the second, desired orientation and a base member, the base member including a supporting portion which supports the at least one circular element of the rotatable member at the peripheral surface thereof,
- wherein said at least one circular element comprises first and second circular elements, and wherein said supporting portion of said base member comprises first and second support frames for supporting said first and second circular elements at their peripheral surfaces, and
- wherein a plurality of rotatable wheels are mounted to each of said first and second support frames, each of said rotatable wheels having a peripheral groove which receives the peripheral surface of a circular element of said rotatable member to support said rotatable member, and wherein each of said plurality of rotatable wheels are adjustably mounted to a support frame.

13. Panel turning apparatus for turning a panel from a first orientation to a second, desired orientation, comprising:
- a rotatable member which is rotatable about an axis of rotation thereof, said rotatable member including:
  - a panel carrying portion which is aligned with the axis of rotation, said panel carrying portion including a plurality of ball bearings mounted to side frames of said panel carrying portion for rolling a panel into or out of said panel receiving chamber and for supporting the panel when said panel is in a vertical orientation,
  - a supported portion by which the rotatable member is supported for rotation, the supported portion comprising at least one circular element having a peripheral surface coaxial with the axis of rotation, and
- a driving portion by which the rotatable member is rotated to turn a panel carried by the panel carrying portion from the first orientation to the second, desired orientation and a base member, the base member including a supporting portion which supports the at least one circular element of the rotatable member at the peripheral surface thereof.

14. Panel turning apparatus for turning a panel from a first orientation to a second, desired orientation, comprising:
- a rotatable member which is rotatable about an axis of rotation thereof, said rotatable member including:
  - a panel carrying portion which is aligned with the axis of rotation,
  - a supported portion by which the rotatable member is supported for rotation,
  - the supported portion comprising a pair of circular elements attached to said supported portion and having peripheral surfaces coaxial with said axis of rotation, and
- a driving portion by which the rotatable member is rotated to turn a panel carried by the panel carrying portion from the first orientation to the second, desired orientation; and
- a base member, the base member including a supporting portion which supports the circular elements of the rotatable member at the peripheral surfaces thereof, the supporting portion comprising:
  - first and second support frames, and
  - a plurality of rotatable wheels mounted to each of said first and second support frames, each of said plurality of wheels having a peripheral groove which receives the peripheral surface of a circular element of said rotatable member to support said rotatable member for rotation around said axis of rotation thereof.

15. Panel turning apparatus for turning a panel from a first orientation to a second, desired orientation, comprising:
- a rotatable member which is rotatable about an axis of rotation thereof, said rotatable member including:
  - a panel carrying portion which is aligned with the axis of rotation,
  - a supported portion by which the rotatable member is supported for rotation,
  - the supported portion comprising a pair of circular elements attached to said supported portion and having peripheral surfaces coaxial with said axis of rotation, and
  - a driving portion by which the rotatable member is rotated to turn a panel carried by the panel carrying portion from the first orientation to the second, desired orientation;
- a base member, the base member including a supporting portion which supports the circular elements of the rotatable member at the peripheral surfaces thereof, the supporting portion comprising:
  - first and second support frames, and
  - a plurality of rotatable wheels mounted to each of said first and second support frames, each of said plurality of wheels having a peripheral groove which receives the peripheral surface of a circular element of said rotatable member to support said rotatable member for rotation around said axis of rotation thereof: and
- wherein said panel carrying portion includes first and second sets of rollers extending parallel to the axis of rotation and defining a panel receiving chamber therebetween for receipt of a panel to be turned.

16. The panel turning apparatus of claim 15 and further including an opening at least one end of said panel receiving chamber for insertion of a panel into and withdrawal of a panel from said chamber.

17. The panel turning apparatus of claim 16 and further including a plurality of ball bearings mounted to side frames of said panel carrying portion for rolling a panel into or out of said rotatable member while said panel is in a vertical orientation.

* * * * *